United States Patent [19]

Ohba

[11] 3,950,691
[45] Apr. 13, 1976

[54] HIGH-OUTPUT SOLID STATE DC-AC INVERTER WITH IMPROVED OVERLOAD PROTECTION AND CONTROL LOGIC CIRCUITRY

[76] Inventor: Shunjiro Ohba, 5969 N. Elston Ave., Chicago, Ill. 60646

[22] Filed: May 20, 1974

[21] Appl. No.: 471,608

Related U.S. Application Data

[63] Continuation-in-part of Ser. No. 401,801, Sept. 28, 1973, abandoned.

[52] U.S. Cl. ............................... 321/11; 307/202 R
[51] Int. Cl.² ......................................... H02M 1/18
[58] Field of Search ............................. 321/11–14, 321/16, 37, 45 R, 45 ER; 330/207; 307/202, 66

[56] References Cited
UNITED STATES PATENTS

| | | | |
|---|---|---|---|
| 3,246,206 | 4/1966 | Chowdhuri | 307/202 |
| 3,351,839 | 11/1967 | Johnston et al. | 321/45 R |
| 3,376,493 | 4/1968 | Carlson | 321/45 ER |
| 3,377,540 | 4/1968 | Meyer | 321/14 |
| 3,480,871 | 11/1969 | Rogers et al. | 330/207 P |
| 3,495,156 | 2/1975 | Hamilton et al. | 211/45 R |
| 3,609,386 | 9/1971 | Patlach | 307/66 |
| 3,710,218 | 1/1973 | Roundy et al. | 321/16 |
| 3,794,907 | 2/1974 | Fucito | 321/16 |
| 3,800,198 | 3/1974 | Graf et al. | 321/14 |

FOREIGN PATENTS OR APPLICATIONS

| | | | |
|---|---|---|---|
| 1,204,682 | 9/1970 | United Kingdom | 321/11 |

OTHER PUBLICATIONS
IBM Technical Disclosure Bulletin, Vol. 9, No. 9, pp. 1217, 1218; Feb., 1967.

*Primary Examiner*—William M. Shoop
*Attorney, Agent, or Firm*—Fitch, Even, Tabin & Luedeka

[57] ABSTRACT

A DC-to-AC inverter is disclosed utilizing a clock oscillator and an amplifying circuit for delivering AC power at a relatively high output level. A protection circuit is provided to sense potentially damaging transient signals, isolate them from the amplifier circuitry, and return most of the power of the transient signals to the DC supply to both conserve power and protect the solid state circuitry. The output transistors are biased such that, as the collector current approaches a predetermined maximum current level, the base-emitter bias voltage of the transistor approaches the maximum amplitude of the applied base drive signal, to limit the collector current which in turn limits the AC output current of the inverter under short circuit conditions. An amplitude sensing circuit measures the output level of the inverter and disables the inverter whenever the AC output or the DC supply voltage goes below a predetermined level. A standby power circuit maintains normal operation of the oscillator and control logic during temporary interruptions or reductions in the DC supply.

16 Claims, 5 Drawing Figures

HIGH-OUTPUT SOLID STATE DC-AC INVERTER WITH IMPROVED OVERLOAD PROTECTION AND CONTROL LOGIC CIRCUITRY

This application is a continuation-in-part of my co-pending application Ser. No. 401,801, filed Sept. 28, 1973, now abandoned.

The present invention generally relates to power inverters and, more specifically, relates to protection and control circuitry for a high-output, solid-state DC to AC power inverter.

A common application for a DC-to-AC power inverter is the generation of the widely-used 120 volt AC supply voltage from a DC source (e.g., a storage battery) in remote locations where the 120 volt AC supply is not available. Such applications include automobiles, trucks, recreational vehicles, trains, aircraft, boats, and the like where it is desired to operate conventional home appliances in the vehicle such as air conditioners, televisions, power tools, or other electrical equipment requiring a 120 volt AC supply. Other applications include emergency vehicles such as ambulances and fire-fighting vehicles which require 120 volt AC supplies to operate special electrical equipment or floodlights. DC-to-AC power inverters are also used as standby emergency power sources for hospitals, factories, homes, etc.

One major problem with DC-to-AC power inverters is the difficulty in economically and reliably generating large amounts of continuous power (e.g., more than 1,000 watts). Moreover, DC-to-AC power inverters capable of delivering power at such levels often break down whenever the instantaneous power required by a utilization device substantially exceeds the rated continuous power of the inverter, especially if the load is large and inductive. A relatively common high-power inductive load utilization device is an air conditioner or refrigerator wherein the compressor motor requires a much larger amount of power for start-up than it does for maintaining continuous operation. When the air conditioner is first turned on, a large instantaneous inductive load is presented to the inverter and prior art inverters designed for this application very often have been subject to catastrophic failures.

Large floodlights, such as those used by fire departments, present another application for a DC-to-AC power inverter wherein the initial power drain is much larger than the continuous power drain. The filament of a large floodlight (and practically an incandescent lamp, for that matter) appears as a short circuit to the output of the inverter when the power is first applied. As the current flows through the filament, however, the filament becomes very hot (enough to emit light) and the resistance of the filament increases substantially so that the inverter output is no longer driving a short circuit.

Such applications not only often destroy many components of conventional inverters but they also alter the frequency of the AC output signal. Other disadvantages of conventional inverters include high power consumption, even during no-load or light load operating conditions, and inadequate safety controls to prevent operation of the inverter at low output voltages which could damage some electrical equipment (e.g., air conditioning compressor motors).

It is therefore an object of the present invention to provide a new and improved high-output, solid-state DC-to-AC power inverter.

It is another object of the invention to provide such an inverter which both protects its internal components from damage due to heavy power loads and conserves input power.

It is a further object of the invention to provide such an inverter having relatively economical construction and simple operation.

It is yet another object of the invention to provide such an inverter which has a very stable output signal frequency.

Other objects and advantages of the invention are more particularly set forth in the following detailed description, and in the accompanying drawings, of which.

Figure 1:
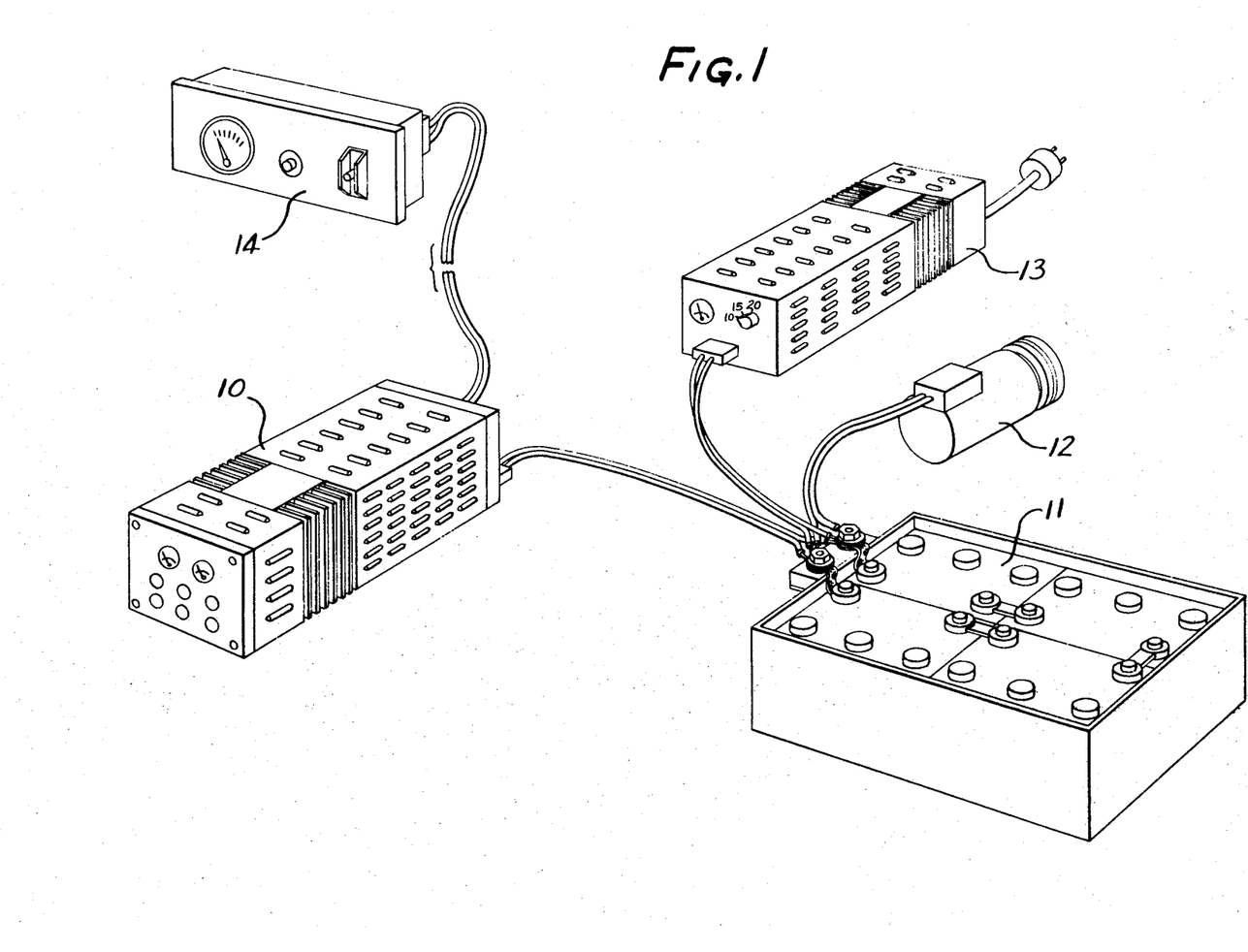
FIG. 1 is a perspective view of a DC/AC power system utilizing a DC-to-AC inverter which incorporates the principles of the present invention.
Figure 2:
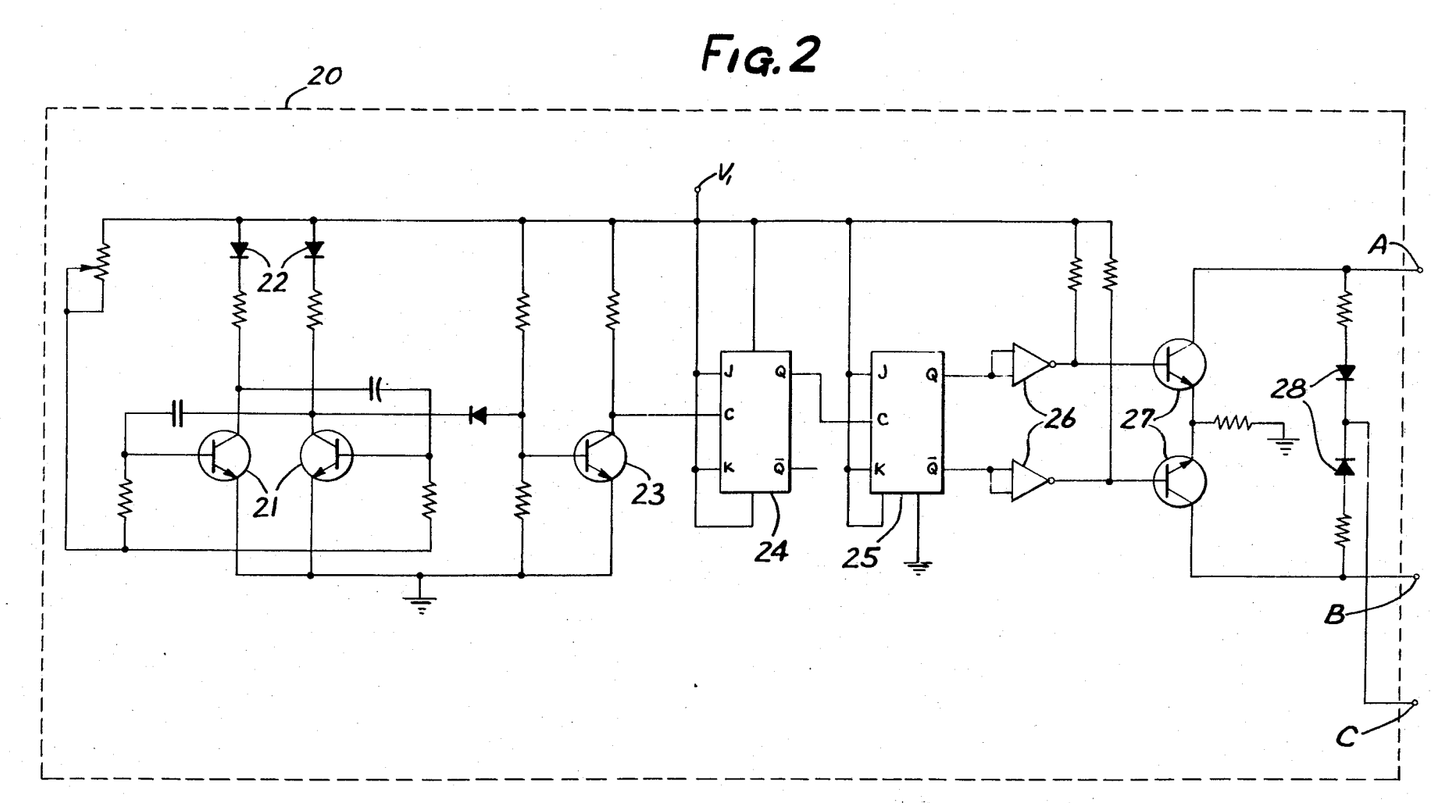
FIG. 2 is a schematic diagram illustrating the oscillator portion of the illustrated embodiment of the present invention.

With reference to FIG. 1, there is generally shown a system incorporating an inverter 10 constructed in accordance with the principles of the invention. In general, inverter 10 is a relatively high-output, solid-state device having internal components (e.g., square-wave signal generators and transformers) which develop internal, potentially damaging high-power transient signals. Inductive loads on the output of inverter 10 create transient signals that are reflected into the internal inverter circuitry of inverter 10, as discussed in greater detail below. As illustrated in FIG. 2, inverter 10 comprises an oscillator circuit 20 responsive to energization from a unidirectional power source for generating a bidirectional signal. In the illustrated embodiment of the invention, the unidirectional power source is a storage battery 11, which may be a single unit or several units combined to obtain the desired DC input voltage and the bidirectional output signal is the commonly-used 120 volt AC power. Oscillator circuit 20 is energized by battery 11 by means of a voltage regulator circuit 100 (see FIG. 4), as discussed in greater detail below. It is understood that although the present invention is discussed primarily in terms of a 24 volt DC/120 volt AC application, the principles thereof may be applied equally as well to any unidirectional to bidirectional power inverter.

Figure 3:
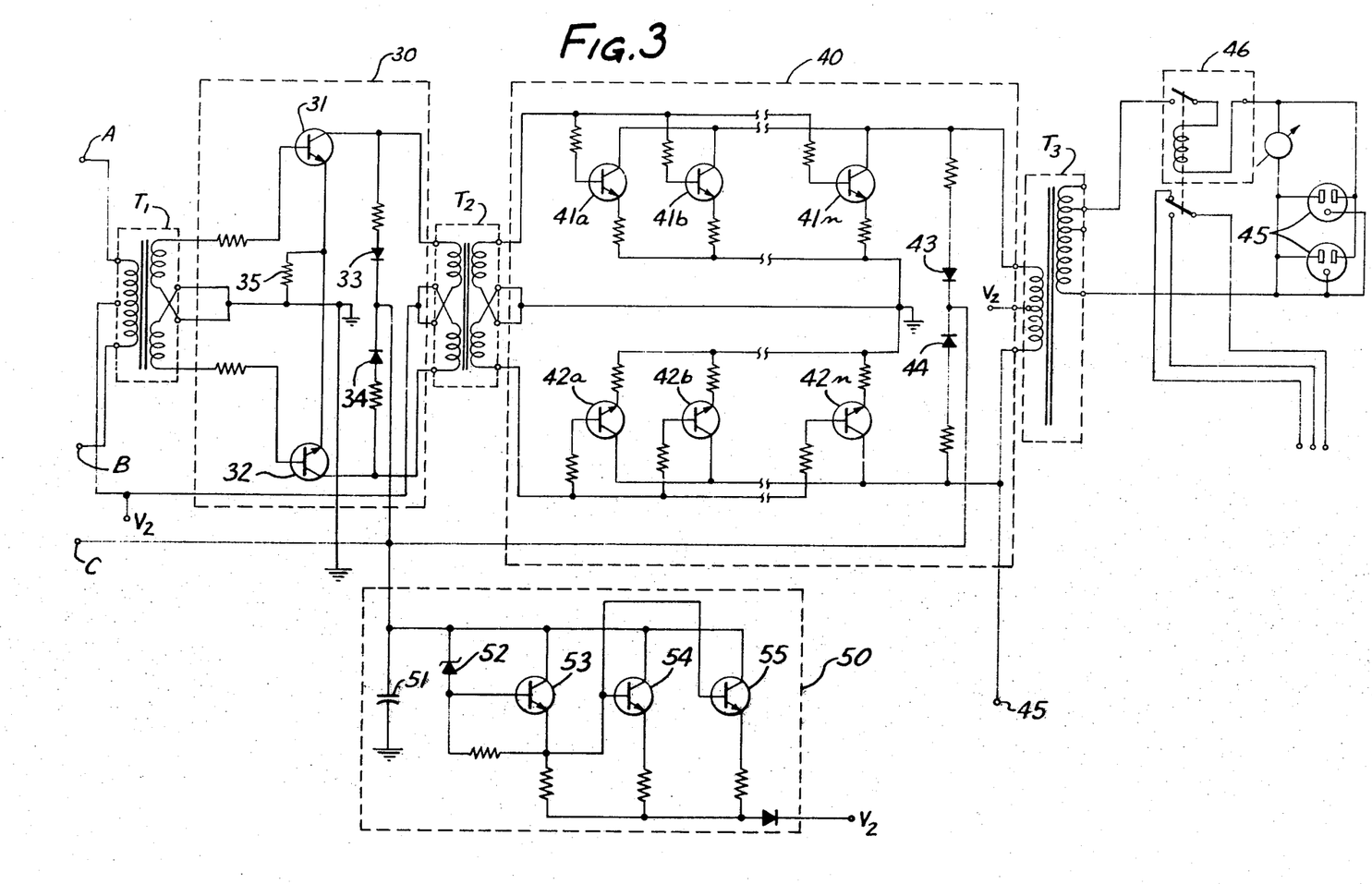
FIG. 3 is a schematic diagram of the amplifier portion of the illustrated embodiment of the present invention.

As illustrated in FIG. 3, inverter 10 also comprises amplifier means in the form of a driver stage 30 and an output stage 40 which are energized by DC storage battery 11 and are responsive to the AC signal from oscillator circuit 20 for amplifying the AC signal to the desired output level.

Figure 4:
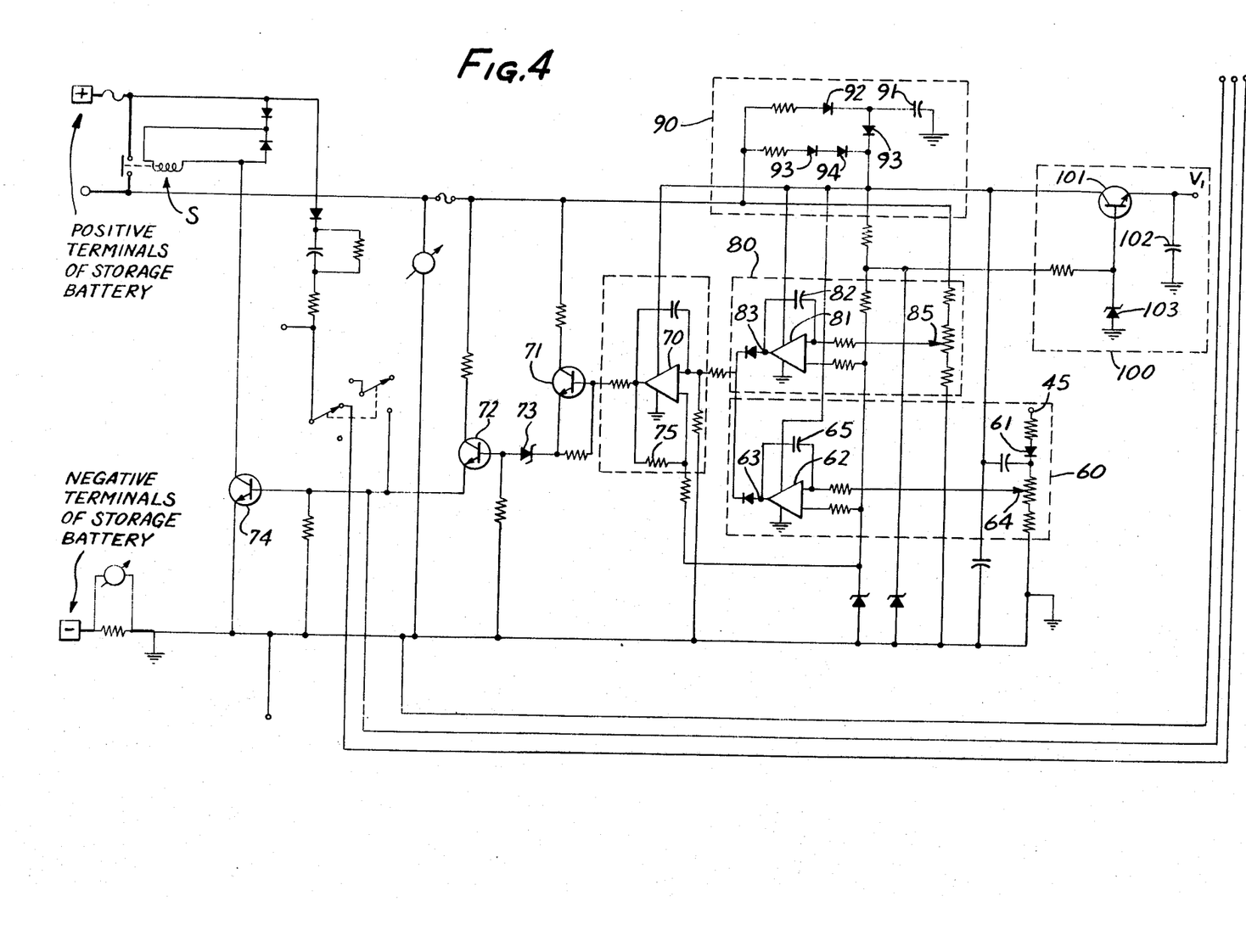
FIG. 4 is a schematic diagram of the control circuitry of the illustrated embodiment of the present invention.

Protection circuit 50 for inverter 10 is illustrated in FIG. 3 and comprises means coupled between the amplifying circuitry and the DC power source for sensing the level of the AC signal at several locations in the circuit and returning that portion of it which exceeds a predetermined level to the battery 11, to both conserve power and protect the AC amplifier from damage resulting from transient signals. Additional protection and control circuitry is illustrated in FIGS. 3 and 4. Storage battery 11 may be charged either from a DC generating unit 12 (e.g., an alternator) mechanically driven, for example, by the engine of an automobile or recreational vehicle (not shown) for example, or by a battery charging unit 13 which converts AC power into suitable DC power for charging storage battery 11. Battery charger 13 may be used in situations where, for example, the recreational vehicle is parked at a campsite provided with 120-volt electrical service. A control and monitoring unit 14 may be utilized as shown to activate and deactivate the inverter as well as monitor the operation thereof.

With reference to FIG. 2, there is shown in schematic diagram form an embodiment of an oscillator means 20 suitable for use in the present invention. Oscillator means 20 comprises a pair of oscillating transistors 21 which operate as an astable multivibrator to produce an oscillatory (i.e., "bidirectional") signal of a predetermined frequency. The desired magnitude and frequency of the oscillator signal may be obtained by using conventional multivibrator design techniques and therefore is not discussed in detail herein. Other types of oscillators (including crystal-controlled oscillators) may of course be used without departing from the principles of the present invention.

The oscillator output signal may be taken from the collector of one of oscillating transistor 21 and applied to a pair of JK flip-flop 24 and 25 (e.g., two halves of a type SN 74107N integrated circuit pack) by means of an amplifying transistor 23 as shown. JK flip-flop 24 is responsive to the amplified oscillatory signal from the collector of amplifying transistor 23 to in effect divide the oscillatory signal by two by generating a pulse at terminal Q only for every second pulse applied at terminal C of flip-flop 24. Flip-flop 25 divides the signal applied to its terminal C by two also and develops a symmetrical square-wave pulse signal at terminals Q and $\overline{Q}$ thereof. Of course, in some applications of the present invention, a single flip-flop may be used and the resonant frequency of the astable multivibrator adjusted accordingly. The square-wave signal is inverted by a pair of inverters 26 and then amplified by a pair of push-pull amplifying transistors 27 to develop symmetrical square-wave (i.e., "bidirectional") signal at output terminals A and B at the desired level. A pair of diode rectifiers 28 are provided as shown having their cathodes connected together and to a terminal C for transient protection purposes described in greater detail below with reference to FIG. 3. Of course, a single-ended oscillator may be used in place of the push-pull embodiment of the invention illustrated in FIG. 2; however, the push-pull approach has proved to be very satisfactory in actual practice for the illustrated embodiment of the invention. In addition, the stability of the output frequency of oscillator circuit 20 in the illustrated embodiment of the invention is largely a function of the stability of the DC supply voltage $V_1$, as hereinafter described in greater detail with reference to FIG. 4.

With reference to FIG. 3, there is shown an embodiment of the amplifier means of the invention including a driver stage 30 and an output stage 40. Driver stage 30 and output stage 40 of the illustrated embodiment of the invention are energized by storage battery 11 of FIG. 1, which is represented by "$V_2$" in FIG. 3, and are responsive to the square-wave signal from terminals A and B of oscillator circuit 20 for amplifying it to the desired output level.

A coupling transformer $T_1$ is utilized to apply the square-wave signal at terminals A and B to the input of driver stage 30. In the illustrated embodiment of the invention, $T_1$ is a step-down transformer and driver stage 30 comprises a pair of amplifying transistors 31 and 32 which are operated in a push-pull fashion to apply an amplified square-wave signal to the output stage 40 by means of a coupling transformer $T_2$. The output of driver stage 30 is protected against potentially damaging transient signals (caused primarily by the square-wave signal and the coupling transformers as well as reflected transient signals created by inductive loads) by means of a pair of diode rectifiers 33 and 34 having their cathodes connected together and to terminal C, as hereinafter described in greater detail. Where desired, of course, transistors 31 and 32 may be operated in a single-ended (nonpush-pull) mode.

Output stage 40 of the illustrated embodiment of the invention includes a plurality of pairs of switching transistors 41a, 42a; 41b, 42b; . . . 41n, 42n; which are operated in a push-pull mode in the illustrated embodiment of the invention. Again, these transistors may be operated in a single-ended mode where desired. The total number of output transistor pairs depends on the required total output for the intended application of the inverter. As with the output of driver stage 30 and oscillator circuit 20, the output of output stage 40 is protected from potentially damaging transient signals by means of a pair of diode rectifiers 43 and 44, which have their cathodes connected together and to Terminal C, as hereinafter described in greater detail.

In accordance with one aspect of the illustrated embodiment of the invention, each transistor in both the driver stage 30 and output stage 40 is biased such that, as its collector current approaches a predetermined maximum current level (i.e., three times the normal maximum operating level, in the illustrated embodiment of the invention), its base-emitter bias voltage approaches the maximum amplitude of the applied AC signal, to thereby limit the collector current of each transistor, which in turn limits the AC output current of the inverter to a predetermined maximum level (i.e., three times the normal maximum level for the illustrated embodiment). For driver stage 30, the maximum collector current level is attained when the load on the output of the inverter is the lightest (e.g., no load). For output stage 40, on the other hand, the maximum collector current level is attained when the load on the output of the inverter is maximum (e.g., a short circuit on the output).

Another feature of the illustrated embodiment of the invention comprises means for protecting the inverter from catastrophic damage or impairment of its performance due to faulty power transistors in output stage 40. Such power transistor faults may occur occasionally during the operation of the inverter or may exist when the power transistors are originally installed in the inverter. In accordance with this feature of the invention, each power transistor in output stage 40 has a fusible resistor connected in series with its base and the transistor is biased such that, upon the breakdown of its collector-emitter junction, sufficient current is applied to the fusible resistor to burn it out of the circuit (i.e., create an open circuit), to thereby effectively remove the faulty power transistor from output stage 40 without affecting the operation of the inverter.

The output of output stage 40 is coupled to a pair of output sockets 45 by means of a coupling transformer $T_3$. It should be noted that the power amplification in the illustrated embodiment of the invention is obtained primarily by utilizing step-down transformers for coupling transformers $T_1$ and $T_2$ to thus amplify the current, and having the push-pull transistor stages amplify the voltage. A delayed action circuit breaker 46 is utilized as shown in FIG. 3 to both protect the inverter from sustained overloads as well as to double as an on/off switch for the inverter and a "reset" switch for the inverter after an overload condition has occurred. Fuses may, of course, be used at strategic locations throughout the inverter to protect it from catastrophic failures.

Figure 5:
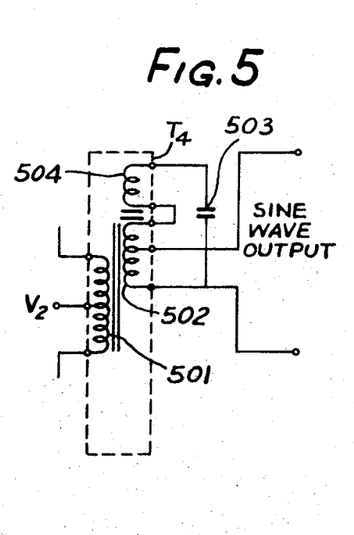
FIG. 5 is a schematic diagram of an alternative embodiment of the output circuit of the present invention.

An alternative output circuit is illustrated in FIG. 5 which provides a relatively pure sine wave at a substantial increase in efficiency. As shown in FIG. 5, resonant-secondary transformer $T_4$ may be substituted for output transformer $T_3$ of FIG. 3. With the square-wave signal from the push-pull output of amplifier circuit 40 applied to the primary winding 501 of transformer $T_4$, and with a loosely-coupled secondary winding 502 of transformer $T_4$ being tuned to resonate at approximately 60 Hertz by tuning capacitor 503, a reduction in the total current in the output transistors of amplifier circuit 40 is obtained while still supplying the same output power. This occurs because, during saturation, the peak primary-winding current of transformer $T_4$ is approximately three times that in conventional circuits. In other words, with this arrangement, output transistor current flows only "on demand"; that is, only during the period of saturation of the transformer, which is approximately 90° of the entire 360° of the sine wave signal or, expressed another way, a 15 percent duty cycle is achieved. The energy thus momentarily stored in transformer $T_4$, together with that of a loosely-coupled harmonics winding 504 which adds odd harmonics to the output signal, provides a relatively pure sine wave output signal. Consequently, no commutating capacitors or "snubbers" are required between the square-wave output signal of amplifier circuit 40 and the primary winding 501 of transformer $T_4$, as required by conventional inverter circuits utilizing silicon controlled rectifiers (SCR) circuitry. An overall effeciency of approximately 90 percent has been realized with this construction as compared with 70 to 80 percent for conventional SCR inverters.

It should be noted that the no-load power drain of driver stage 30 may be reduced by incorporating a resistor 35 as shown which, in conjunction with the self-limiting collector current feature described above, conserves approximately 50% of the driver power consumption.

As explained above, the output of oscillator means 20 is a symmetrical, bidirectional (AC square-wave) signal. With a square-wave signal and transformer-coupled stages, rather large transient signals are inherently developed. Moreover, inductive loads on the inverter output cause reflected transients internally which are also potentially damaging to the circuits of the inverter. Unless these transients are quickly removed from the circuit, various compounds, especially the transistors, are likely to be damaged. These transients (which often exceed 200 watts of power) are sometimes reduced or substantially eliminated by merely short-circuiting them through a disabling network to ground, but such approaches to the problem have not been very practical.

In accordance with another aspect of the present invention, protection means in the form of a dynamic transient supression and power recovery circuit 50 is coupled to drive stage 30, output stage 40, as well as oscillator circuit 20 for sensing the level of the respective output signals and extracting that portion of those output signals which exceed a predetermined level and returning them to the DC power source (i.e., battery 11), to thereby both conserve power and protect the respective circuit from damage resulting from transient signals. In the embodiment of the invention illustrated in FIG. 3, transient suppression and recovery circuit 50 comprises rectifying means in the form of diode rectifiers 28 of the oscillator circuit 20; 33, 34 of driver stage 30; and 43, 44 of output stage 40 having their respective cathodes connected to a common terminal C for rectifying those portions of the respective output signals that exceed a predetermined level. Where desired, of course, such diode rectification may be utilized at fewer or more locations throughout the inverter circuit without departing from the principles of the invention. An energy storage means in the form of a storage capacitor 51 is coupled to terminal C for temporarily storing the rectified portion of the respective signals. An energy recovery means including a zener diode 52, a driver transistor 53 and a pair of power transistors 54 and 55 is coupled between storage capacitor 51 and the battery supply 11 (respresented by $V_2$ in FIG. 3) for returning at least a portion of the temporarily stored energy to the battery. Selection of the level at which the transient suppression circuit 50 will operate is achieved primarily by the breakdown voltage of zener diode 52.

The transient signal energy extracted from the internal circuitry of the inverter need not be returned to the DC power supply, of course. Instead, it may be utilized as a source of power for other uses or it may be dissipated as heat with a suitable resistor connected to ground.

Alternatively, in some embodiments of the present invention it may be desirable to replace transient supresion circuit 50 with a DC-to-DC converter circuit to substantially increase the efficiency of the recovery circuit. This would most likely be warranted in embodiments of the invention wherein the energy consumed by transient signals in the circuit exceeds several hundred watts. Of course, other methods of recovering the otherwise lost transient signal energy may be utilized without departing from the principles of the present invention. Thus, in effect, not only are the potentially damaging transient signals eliminated from the internal circuitry of the inverter but the energy represented thereby is recovered and returned to storage battery 11 to increase the inverter's efficiency.

With reference to FIG. 4, bidirectional signal amplitude sensing means in the form of an AC level detector circuit 60 is coupled to output circuit 40 at terminal 45 (see FIG. 3) of coupling transformer $T_3$ for sensing the level of the AC output signal on the primary of coupling transformer $T_3$. AC detector circuit 60 includes a diode 61 and an operational amplifier 62 (e.g., a type LM307N integrated circuit pack) for integrating the detected AC signal level and developing an output signal at terminal 63 whenever the AC output signal of output stage 40 falls below a predetermined level. For typical air conditioning applications of the present invention, this minimum AC voltage is approximately 95 volts. Below that level the compressor motor of the air conditioner may be damaged by insufficient voltage on the motor windings. The threshold voltage may be adjusted by means of a potentiometer 64 which is connected between rectifying diode 61 and one of the input terminals of operational amplifier 62. Integrating capacitor 65 is connected between the inverting input of operational amplifier 62 and its output terminal 63 to delay AC level detector circuit so that it does not produce a control signal at output circuit 63 unless the output voltage of output stage 40 falls below the predetermined level for more than a very short period of time (e.g., 1 second).

A switching means, including an operational amplifier 70, a pair of driver transistors 71 and 72, a voltage-shifting zener diode 73, a relay-driver transistor 74, and a solenoid S, is responsive to the output at terminal 63 of AC level detector circuit 60 and the terminals of storage battery 11 for disabling the inverter whenever the amplitude of the AC output signal of output stage 40 falls below a predetermined level. Operational amplifier 70 has a fixed resistor 75 connected from its non-inverting input terminal to its output terminal to provide positive feedback which results in hysteresis to insure a definite switching signal and avoid what is sometimes referred to as "contact bounce".

In accordance with another aspect of the illustrated embodiment of the invention, means in the form of a DC level detecting circuit 80 are provided for sensing the amplitude of the voltage of storage battery 11. DC level detecting circuit 80 includes an operational amplifier 81 and a voltage dividing network including a level-adjusting potentiometer 85 for developing an output signal at terminal 83 whenever the voltage of storage battery 11 falls below a predetermined level (for a 24 volt DC supply, for example, a typical minimum threshold voltage would be 19 volts). The output signal of terminal 83 is applied to the switching means including operational amplifier 70, similar to the output of AC level detecting circuit 60, for disabling the inverter whenever the amplitude of the storage battery voltage falls below a predetermined level. To prevent DC level detecting circuit 80 from disabling the inverter during brief dips in the battery voltage caused by battery overloads (e.g., short-circuiting the output terminals of the inverter, etc.) an integrating capacitor 82 is connected from the inverting input terminal of operational amplifier 81 to output terminal 83, which thereby delays the detecting action of operational amplifier 81 for a short period of time (e.g., 2 seconds).

In accordance with another aspect of the illustrated embodiment of the invention, means are provided in the form of a power sustaining circuit 90 coupled to the storage battery by means of at least one unidirectional isolation device for supplying unidirectional power to oscillator circuit 20 (by means of a voltage regulator circuit 100, as explained in greater detail below) and detector circuits 50 and 80, to thereby maintain normal operation of the inverter during temporary interruptions in the DC supply power (e.g., during overload conditions such as a short circuit on the output of the inverter). Circuit 90 includes a storage capacitor 91 coupled to one of the terminals of storage battery 11 by means of a diode 92. Diode 92 isolates the storage capacitor 91 from storage battery 11 when the battery voltage temporarily falls below its normal operating level. The energy stored in capacitor 91 is applied to voltage regulator circuit 100 and detector circuits 60 and 80 by means of a diode 93. To equalize the voltage applied during brief interruptions in DC power with that normally applied to circuits 60, 80, and 100, two diodes 93 and 94 are connected between storage battery 11 and circuits 60, 80, and 90 as shown. Thus, diodes 93 and 94 provide an instantaneous start circuit to avoid the delay that would otherwise occur because of the amount of time required to initially charge storage capacitor 91.

In accordance with another aspect of the illustrated embodiment of the invention, voltage regulator circuit 100 is coupled between storage battery 11 and oscillator circuit 20 to maintain the voltage supplied to oscillator circuit 20 (voltage "$V_1$", in FIG. 2) at a substantially uniform level. Voltage regulator circuit 100 includes a regulating circuit 101, a storage capacitor 102 and a zener diode 103 to provide DC voltage regulation in an essentially conventional manner. Using voltage regulator circuit 100 in conjunction with circuit 90, however, insures that oscillator circuit 20 continues to operate in a normal manner even after a temporary loss of DC power due, for example, to a shorting of the output terminals of the inverter. Consequently, the frequency of the output signal of the inverter remains practically unchanged (less than 0.1 percent for the illustrated embodiment of the invention) regardless of the loading conditions on the output of the inverter. Of course, after a preset interval of time (e.g., 2 seconds), delayed action circuit breaker 46 takes over and disables the inverter to prevent prolonged overloading of the inverter.

Thus, a new and improved high-output, solid state DC-to-AC power inverter has been shown and described. The inverter of the invention protects its internal components from damage due to heavy power loads (including short circuits on the output) and conserves input power. In fact, no damage is done to the inverter when an absolute short circuit is applied across its output terminals. If the short circuit condition does not cease within a predetermined time (e.g., 1.5 to 2 seconds), a delayed action circuit breaker shuts off the inverter. Even during short circuit conditions, the frequency of the output signal remains practically unchanged (e.g., less than 0.1% change.). Control logic is provided to prevent the inverter from damaging certain electrical equipment (air conditioner compressor motors and the like) when the DC input or AC output signals fall below a predetermined level. Transient signals, both inherent and reflected, are not only removed from the internal circuitry before they can damage the components but their energy is returned in usable form to the DC supply.

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

. Various features of the invention are set forth in the following claims.

What is claimed is:

1. An inverter for converting power from a uni-directional power source to bi-directional electrical power at a predetermined output level, said inverter having components therein which develop internal potentially damaging transient signals, comprising:

oscillator means responsive to energization from said unidirectional power source for generating a bidirectional signal;

amplifier means energized by said unidirectional power source and responsive to said bidirectional signal for amplifying said bidirectional signal to said output level;

and protection means coupled to said amplifying means for sensing the level of said bidirectional signal and extracting that portion of said bidirectional signal which exceeds a predetermined level, said protection means including rectifying means connected to said amplifying means for rectifying said bidirectional signal, storing means connected to said rectifying means for storing said rectified signal, current only flowing to said storing means when the voltage of the rectified signal exceeds the voltage level of the signal stored in said storing means, and means connected to said storing means for extracting only the portion of the signal stored therein which exceeds said predetermined level, thereby protecting said amplifying means from damage resulting from said transient signals.

2. An inverter according to claim 1, in which said extracted portion of said bidirectional signal is returned to said unidirectional power source to thereby conserve power and increase the efficiency of the system.

3. An inverter according to claim 1, in which said amplifying means includes a plurality of parallel connected power transistors with the bidirectional signal from said oscillator means connected in series with the emitter-base junctions of said power transistors and said unidirectional power source being connected in series with the collector-emitter junctions of said power transistors, each said power output transistors having a fusible resistor connected in series with its base and biased such that upon the breakdown of the collector-emitter junction thereof sufficient current is applied to said resistor through said base-collector junction of said transistor to burn it out of the circuit, thereby creating an open circuit through the transistor which effectively removes said transistor from the parallel amplifying circuit without affecting the operation of the inverter.

4. An inverter according to claim 1, which further comprises energy storage means coupled to said unidirectional power source by means of a unidirectional isolation device, said energy storage means coupled to said oscillator means for solely supplying unidirectional power to said oscillator means whenever the magnitude of said unidirectional power source falls below the level of the signal stored in said storage means, to thereby maintain normal operation of said inverter during brief interruptions in said unidirectional power source due to temporary overloads on the system or the like.

5. An inverter according to claim 4, in which said energy storing means comprises a storage capacitor and said unidirectional device comprises at least one diode.

6. An inverter according to claim 1, in which said amplifying means comprises a bidirectional signal amplifier operating in a switching mode, said bidirectional signal amplifier having at least one switching transistor biased such that as the collector current approaches a predetermined maximum current level the base-emitter biases voltage of said switching transistor approaches the maximum amplitude of the applied base drive signal, to thereby limit the output current of said bidirectional signal amplifier to a predetermined maximum level regardless of the size of the load supplied by said amplifier.

7. An inverter according to claim 6, in which said bidirectional signal amplifier is operated in a push-pull switching mode, said amplifier having at least one pair of switching transistors operated in a push-pull mode and biased such that as the collector current of each of said transistor approaches a predetermined maximum current level the base-emitter bias voltage of the respective switching transistor approaches the maximum amplitude of the applied bidirectional signal, to thereby limit the output current of said bidirectional signal amplifier to a predetermined maximum level regardless of the size of the load supplied by said amplifier.

8. An inverter according to claim 1 wherein said amplifying means comprises a driver stage and an output stage, said driver stage including a pair of switching transistors operating in a push-pull mode and biased such that as the collector current of each said transistor approaches a predetermined maximum current level the base-emitter bias voltage of that transistor approaches the maximum amplitude of the applied bidirectional signal, to thereby limit the output current of said amplifying means to a predetermined maximum level during relatively light output load operating conditions; and said output circuit includes at least one pair of switching transistors operated in a push-pull mode and biased such that as the collector current of each said transistor approaches a predetermined maximum current level the base-emitter bias voltage approaches the maximum amplitude of the applied bidirectional signal, to thereby limit the output current of said amplifying means during relatively heavy load operating conditions including short circuits of the output of said amplifying means.

9. An inverter according to claim 1, in which said oscillator means comprises an oscillator circuit including an astable multivibrator for generating an oscillatory signal having a predetermined frequency, a first flip-flop switching means coupled to said oscillator circuit and responsive to said oscillatory signal for generating pulses at one half of the frequency of said predetermined frequency, and a second flip-flop switching means coupled to the output of said first flip-flop switching means for generating a substantially symmetrical square-wave signal for application to said amplifying means.

10. An inverter according to claim 1 in which said amplifier means includes a plurality of switching transistors connected to operate in a push-pull mode, and which further includes an output transformer having its primary winding coupled in the output of said amplifier means and its secondary winding tuned to a predetermined resonant frequency.

11. An inverter for converting power from a unidirectional power source to bi-directional electrical power at a predetermined output level, said inverter having components therein which develop internal potentially damaging transient signals, comprising:

oscillator means responsive to energization from said unidirectional power source for generating a bidirectional signal;

amplifier means energized by said unidirectional power source and responsive to said bidirectional signal for amplifying said bidirectional signal to said output level;

protection means coupled between said amplifier means and said unidirectional power source for sensing the level of said bidirectional signal and extracting that portion of said bidirectional signal which exceeds a predetermined level, said protection means including means for temporarily storing said extracted portion of the bidirectional signal, thereby protecting said amplifier means from damage resulting from said transient signals;

a bidirectional signal amplitude sensing means coupled to the output of said amplifier means for sensing the level of said bidirectional output signal and developing a control signal whenever said bidirectional signal falls below a predetermined level for a predetermined period of time;

and switching means coupled between said amplitude sensing means and said unidirectional power source and responsive to said control signal for disabling said inverter whenever the amplitude of the bidirectional signal falls below a predetermined level for a predetermined period of time.

12. An inverter according to claim 11, in which said switching means comprises a threshold sensing means having a positive feedback path to provide hysteresis, to thereby render the action of said switching means more definite.

13. An inverter for converting power from a unidirectional power source to bi-directional electrical power at a predetermined output level, said inverter having components therein which develop internal potentially damaging transient signals, comprising:

oscillator means responsive to energization from said unidirectional power source for generating a bidirectional signal;

amplifier means energized by said unidirectional power source and responsive to said bidirectional signal for amplifying said bidirectional signal to said output level;

protection means coupled between said amplifying means and said unidirectional power source for sensing the level of said bidirectional signal and extracting that portion of said bidirectional signal which exceeds a predetermined level, said protection means including means for temporarily storing said extracted portions of the bidirectional signal, thereby protecting said amplifying means from damage resulting from said transient signals;

means for sensing the amplitude of said unidirectional power source and developing a control signal whenever said unidirectional signal falls below a predetermined level for a predetermined period of time;

and switching means coupled between said unidirectional amplitude sensing means and said unidirectional power source for disabling the inverter whenever the amplitude of said unidirectional power source falls below a predetermined level for a predetermined period of time.

14. An inverter according to claim 13, which further comprises delay means including an integrating capacitor for rendering said unidirectional amplitude sensing means unresponsive to temporary reductions in the amplitude of said unidirectional power source below said predetermined level.

15. An inverter according to claim 13, in which said switching means comprises a threshold sensing means having a positive feedback path to provide hysteresis, to thereby render the action of said switching means more definite.

16. An inverter for converting power from a unidirectional power source to bi-directional electrical power at a predetermined output level, said inverter having components therein which develop internal potentially damaging transient signals, comprising:

oscillator means responsive to energization from said unidirectional power source for generating a bidirectional signal;

amplifier means energized by said unidirectional power source and responsive to said bidirectional signal for amplifying said bidirectional signal to said output level;

and protection means coupled between said amplifying means and said unidirectional power source for sensing the level of said bidirectional signal and extracting that portion of said bidirectional signal which exceeds a predetermined level, said protection means including means for temporarily storing said extracted porton of the bidirectional signal, thereby protecting said amplifying means from damage resulting from said transient signals, said extracted portion of said bidirectional signal being returned to said unidirectional power source to thereby conserve power and increase the efficiency of the system, said protection means comprising rectifying means coupled to the output of said amplifying means for rectifying that portion of said output signal that exceeds a predetermined level; energy storage means coupled to said rectifying means for temporarily storing said rectified portion of the output signal; and energy recovery means coupled between said energy storage means and said unidirectional power source for returning at least a portion of said temporarily stored energy to said unidirectional power source.

* * * * *